United States Patent [19]

Nakajima

[11] Patent Number: 4,896,038
[45] Date of Patent: Jan. 23, 1990

[54] RADIATION IMAGE READ-OUT METHOD AND APPARATUS

[75] Inventor: Nobuyoshi Nakajima, Kanagawa, Japan

[73] Assignee: Fuji Photo Film Co., Ltd., Kanagawa, Japan

[21] Appl. No.: 148,832

[22] Filed: Jan. 27, 1988

[30] Foreign Application Priority Data

Jan. 27, 1987 [JP] Japan ............................ 62-17041

[51] Int. Cl.$^4$ ............................................ G03B 42/02
[52] U.S. Cl. ............................. 250/327.2; 250/484.1
[58] Field of Search ........... 250/327.2, 484.1, 327.2 C, 250/327.2 D, 327.2 G, 484.1 B; 382/22, 19; 358/284

[56] References Cited

U.S. PATENT DOCUMENTS 4,258,264 3/1981 Kotera et al. .

FOREIGN PATENT DOCUMENTS 0178675 4/1986 European Pat. Off. ...... 250/327.2 E
56-11395 4/1981 Japan .

OTHER PUBLICATIONS

Young et al, Handbook of Pattern Recog and Image Process, (1986), pp. 224–225.

Primary Examiner—Janice A. Howell
Assistant Examiner—Richard Hanig
Attorney, Agent, or Firm—Sughrue, Mion, Zinn, Macpeak & Seas

[57] ABSTRACT

In a radiation image read-out method and apparatus, final read-out is carried out for obtaining image signals for use in reproduction of a visible image from a recording medium carrying a radiation image of an object recorded thereon, image processing conditions for use in processing of the final read-out signals obtained by the final read-out are adjusted, and image processing of the final read-out image signals is carried out by use of the image processing conditions. In the case where subdivision image recording is carried out by exposing each of a plurality of subdivisions on the recording medium to radiation in the course of the radiation image recording, image signals at a subdivision, which has not been exposed to the radiation, is removed from the final read-out image signals on the basis of information on subdivision image recording, and the image processing conditions are adjusted on the basis of the remainder of the final read-out image signals.

9 Claims, 3 Drawing Sheets

FIG.5

RADIATION IMAGE READ-OUT METHOD AND APPARATUS

BACKGROUND OF THE INVENTION

1. Field of the Invention

This invention relates to a radiation image read-out method wherein final read-out is carried out for obtaining image signals for use in reproduction of a visible image from a recording medium such as a stimulable phosphor sheet carrying a radiation image recorded thereon, image processing conditions for use in processing of the final read-out image signals obtained by the final read-out are adjusted on the basis of the final read-out image signals, and the final read-out image signals are processed by use of the image processing conditions, and an apparatus for carrying out the method. This invention particularly relates to a radiation image read-out method wherein the image processing conditions are accurately adjusted in the case where the radiation image recording is carried out by subdivision image recording, and an apparatus for carrying out the method.

2. Description of the Prior Art

When certain kinds of phosphors are exposed to radiation such as X-rays, $\alpha$rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to radiation passing through an object such as the human body to have a radiation image of the object stored thereon, and is then exposed to stimulating rays such as a laser beam which cause the stimulable phosphor sheet to emit light in proportion to the stored radiation energy. The light emitted by the stimulable phosphor sheet upon stimulation thereof is photoelectrically detected to obtain final read-out image signals for use in reproduction of a visible image, image processing is carried out on the final read-out image signals, and the radiation image of the object is reproduced as a visible image by use of the processed final read-out image signals on a recording material such as a photographic film, a display device such as a cathode ray tube (CRT), or the like.

In this specification, detection of the image signals for use in reproduction of the visible image is referred to as the final read-out, and the image signals obtained by the final read-out are referred to as the final read-out image signals. The terms "final read-out" and "final read-out image signals" are used in the same senses also in the case where the recording medium is of the type different from the stimulable phosphor sheet.

In general, the image processing in the aforesaid radiation image recording and reproducing system is carried out by use of image processing conditions adjusted for each image in accordance with the image recording portion of the object and/or the image recording method to obtain a visible image suitable for viewing, particularly for diagnostic purposes. However, it may be considered that the image processing conditions be adjusted on the basis of, for example, the final read-out image signals (a histogram of the final read-out image signals or the like), instead of the image recording portion of the object and/or the image recording method, or on the basis of both the final read-out image signals and the image recording portion of the object and/or the image recording method.

In the case where the image processing is carried out by use of the image processing conditions adjusted on the basis of the final read-out image signals which directly represent the nature of each radiation image, it becomes possible to obtain a visible image always having an improved image quality, particularly a high diagnostic efficiency and accuracy, i.e. a visible image wherein the necessary object image information is always expressed within the density range suitable for viewing, particularly for diagnostic purposes, regardless of any fluctuation in the level of the radiation energy stored on the stimulable phosphor sheet, which is caused by changes in the object, the image recording portion thereof, radiation dose, or the like.

In the case where a radiation image is recorded on the stimulable phosphor sheet, subdivision image recording is often carried out. In subdivision image recording, the recording region on the stimulable phosphor sheet is divided into a plurality of subdivisions, and the respective subdivisions are exposed to radiation for image recording. Subdivision image recording is economical since, for example, when an image of a small object portion is recorded on a large stimulable phosphor sheet, images of a plurality of object portions may be recorded on a single stimulable phosphor sheet. Also, the radiation image recording and read-out processing speed becomes high.

However, in the case where subdivision image recording as mentioned above is carried out, the final read-out image signals may not accurately represent the natures of the actually recorded images. Specifically, as shown in, for example, FIG. 2, in the case where the number of the subdivisions at which the image recording is actually carried out (three subdivisions in this example) is smaller than the total number of the subdivisions to which the recording region on the stimulable phosphor sheet is divided (four subdivisions in this example), the final read-out image signals also include read-out signals detected from the subdivision at which no image is recorded. Therefore, the final read-out image signals, for example a histogram thereof, used for ascertaining the natures of the images (image input information) do not correctly represent the radiation images actually stored on the stimulable phosphor sheet.

In such a case, even though the image processing conditions are adjusted based on the final read-out image signals, it is not always possible to adjust the image processing conditions to appropriate values.

Besides the case of the image recording wherein the stimulable phosphor sheet is utilized, the aforesaid problems with regard to the adjustment of the image processing conditions arise generally in the case where radiation images are recorded on a recording medium by subdivision image recording.

By the term "image processing conditions" as used herein are meant various conditions affecting the relationship between the input to the image processing means and the output thereof, for example, gradation processing conditions and frequency response processing conditions.

SUMMARY OF THE INVENTION

The primary object of the present invention is to provide a radiation image read-out method wherein image processing conditions are adjusted to appropriate values by eliminating adverse effects of final read-out image signals detected from a portion of a recording medium where no radiation image is recorded.

Another object of the present invention is to provide a radiation image read-out method which enables reproduction of a visible image having an improved image quality, particularly a high diagnostic efficiency and accuracy.

The specific object of the present invention is to provide an apparatus for carrying out the radiation image read-out method.

The present invention provides a radiation image read-out method in which final read-out is carried out for obtaining image signals for use in reproduction of a visible image from a recording medium carrying a radiation image of an object recorded thereon, image processing conditions for use in processing of the final read-out image signals obtained by the final read out are adjusted, and image processing of the final read-out image signals is carried out by use of the image processing conditions, wherein the improvement comprises the steps of, in the case where subdivision image recording is carried out by exposing each of a plurality of subdivisions on said recording medium to radiation in the course of the radiation image recording:

(i) removing image signals at a subdivision, which has not been exposed to the radiation, from said final read-out image signals obtained by said final read-out on the basis of information on said subdivision image recording, and (ii) adjusting said image processing conditions on the basis of the remainder of said final read-out image signals.

The present invention also provides a radiation image read-out apparatus comprising:

(i) a final read-out system for detecting final read-out image signals for use in reproduction of a visible image from a recording medium carrying a radiation image of an object recorded thereon, (ii) an unexposed region recognizing means for receiving information on subdivision image recording carried out in the course of the radiation image recording on said recording medium, detecting the region of an unexposed subdivision, at which no radiation image recording has been carried out, on the basis of said information on subdivision image recording, and generating a region designating signal which represents said region, (iii) a signal extraction means for receiving the final read-out image signals generated by said final read-out system and said region designating signal, removing the image signals at said region represented by said region designating signal from said final read-out image signals, and feeding out only the remainder of said final read-out image signals, (iv) a control means for adjustment of image processing conditions, which are to be used in image processing of said final read-out image signals generated by said final read-out system, on the basis of said final read-out image signals at an exposed region fed out from said signal extraction means, and (v) a signal processing means for carrying out image processing of said final read-out image signals generated by said final read-out system by use of said image processing conditions adjusted by said control means.

By the term "recording medium" as used herein is meant a medium capable of recording a radiation image thereon, such as a stimulable phosphor sheet. However, the recording medium is not limited to the stimulable phosphor sheet.

By the term "final read-out image signals" as used herein are meant the image signals for use in reproduction of a visible image which are detected from the recording medium. In the present invention, the final read-out image signals used in the course of adjustment of the image processing conditions are the same as the image signals subjected to image processing.

Also, the term "adjusting the image processing conditions on the basis of the remainder of final read-out image signals" as used herein embraces the case wherein the image processing conditions are adjusted based on the the aforesaid remainder of the final read-out image signals alone and the case wherein they are adjusted based on the remainder of the final read-out image signals and other factors, for example, the image recording portion of the object and/or the image recording method.

Adjustment of the image processing conditions may be carried out in any manner insofar as the adjustment is effected on the basis of the aforesaid remainder of the final read-out image signals, i.e. by the utilization of the remainder of the final read-out image signals.

The image processing conditions may typically be gradation processing conditions, but are not limited thereto.

With the radiation image read-out method and apparatus in accordance with the present invention wherein adverse effects of the read-out image signals detected at the unexposed region of the recording medium where no radiation image recording has been carried out in subdivision image recording are eliminated in the course of adjustment of the image processing conditions based on the final read-out image signals, image input information on the object can be ascertained accurately, and the image processing conditions can be adjusted to appropriate values. Therefore, with the radiation image read-out method and apparatus in accordance with the present invention, it becomes possible to always provide a reproduced visible image having an improved image quality, particularly a high diagnostic efficiency and accuracy.

DESCRIPTION OF THE PREFERRED EMBODIMENTS

The present invention will hereinbelow be described in further detail with reference to the accompanying drawings.

Figures 1, 2:
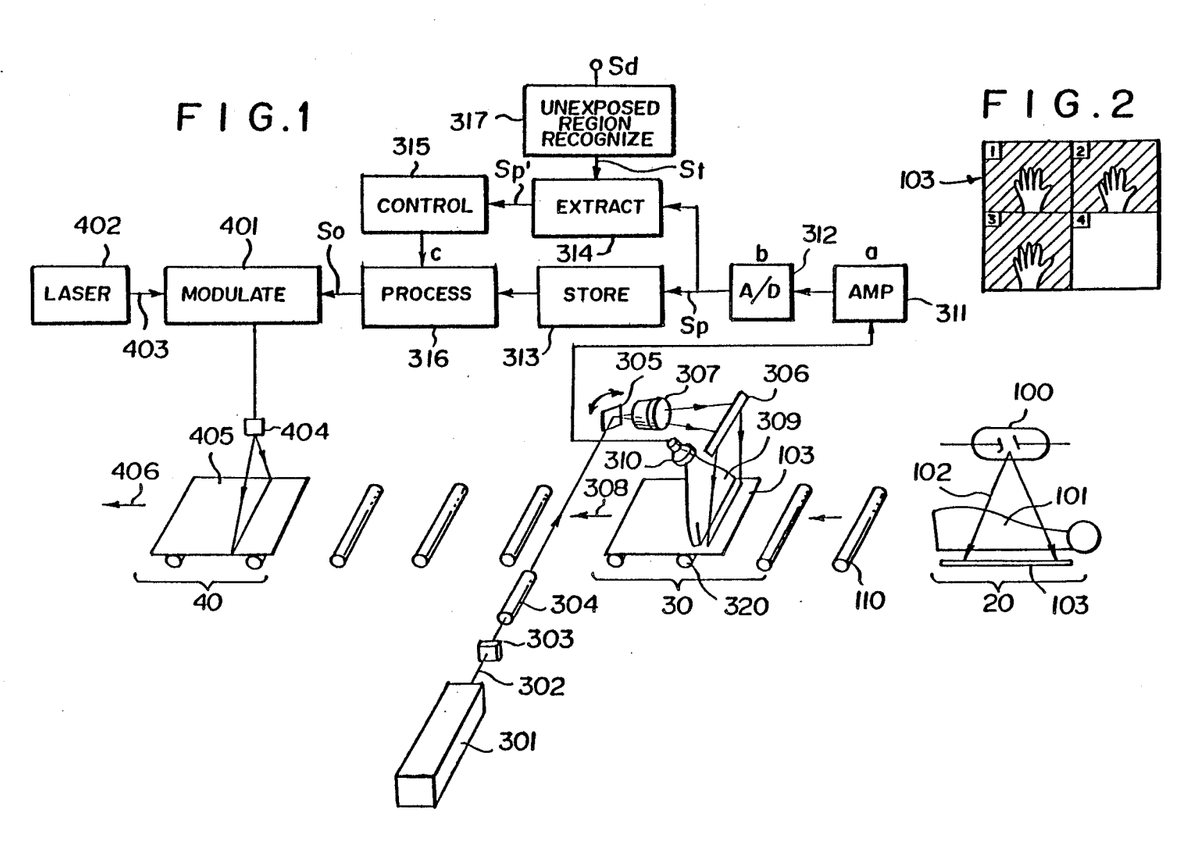
FIG. 1 is a schematic view showing the radiation image recording and reproducing system wherein radiation image read-out is carried out by an embodiment of the radiation image read-out apparatus in accordance with the present invention.
FIG. 2 is an explanatory view showing the condition of radiation image recording on a stimulable phosphor sheet.

With reference to FIG. 1, a radiation image recording and reproducing system basically comprises a radiation image recording section 20, a final read-out section 30, and an image reproducing section 40. At the radiation image recording section 20, a radiation 102 is emitted by a radiation source 100 constituted by an X-ray tube or the like toward an object 101. A stimulable phosphor sheet 103 for storing radiation energy thereon is placed at the position exposed to the radiation 102 passing through the object 101, and a radiation image of the object 101 :s stored on the stimulable phosphor sheet 103.

The stimulable phosphor sheet 103 carrying the radiation image of the object 101 stored thereon is sent to the final read-out section 30 by a sheet conveyance means 110 constituted by a conveyor roller or the like. At the final read-out section 30, a laser beam 302 emanated by a laser beam source 301 is first passed through a filter 303 for cutting off light having a wavelength within the range identical with the range of the wavelength of the light emitted by the stimulable phosphor sheet 103 upon stimulation thereof by the laser beam 302. Then, the beam diameter of the laser beam 302 is strictly adjusted by a beam expander 304. The laser beam 302 is then linearly deflected by a light deflector 305 formed of a galvanometer mirror or the like, and is made to impinge upon the stimulable phosphor sheet 103 by a plane reflection mirror 306. The laser beam source 301 is selected so that the laser beam 302 emanated thereby has a wavelength distribution different from and far apart from the wavelength distribution of the light emitted by the stimulable phosphor sheet 103 upon stimulation thereof. Between the light deflector 305 and the plane reflection mirror 306 is disposed an $f\theta$ lens 307 for maintaining the beam diameter of the laser beam 302 uniform in the course of the scanning of the laser beam 302 on the stimulable phosphor sheet 103. While the laser beam 302 impinges upon the stimulable phosphor sheet 103, the stimulable phosphor sheet 103 is moved in the direction as indicated by the arrow 308 (i.e. in the sub-scanning direction) by a sheet conveyance means 320 constituted by conveyor rollers or the like and, consequently, the overall area of the stimulable phosphor sheet 103 is exposed to and scanned by the laser beam 302. Upon exposure to the laser beam 302, the stimulable phosphor sheet 103 emits light in proportion to the radiation energy stored thereon, and the light emitted enters a light guide member 309 which is made of the same material and has the same configuration as the light guide member 207 used for the preliminary read-out. The light emitted by the stimulable phosphor sheet 103 is guided inside of the light guide member 309 through total reflection, emanated from the light output face of the light guide member 309 and received by a photodetector 310 constituted by a photomultiplier or the like. The light receiving face of the photodetector 310 is closely contacted with a filter for selectively transmitting only the light having the wavelength distribution of the light emitted by the stimulable phosphor sheet 103, so that the photodetector 310 can detect only the light emitted thereby.

The output of the photodetector 310 photoelectrically detecting the light emission representing the radiation image stored on the stimulable phosphor sheet 103 is amplified to an appropriate level by an amplifier 311 on the basis of a read-out gain (a) adjusted to an appropriate value. The amplified electric signals are fed to an A/D converter 312 which converts the electric signals into digital signals of an appropriate signal level width on the basis of a scale factor (b) adjusted to an appropriate value and feeds out them as final read-out image signals Sp. The final read-out image signals Sp are stored in a storage circuit 313 constituted by a frame memory or the like, and are fed to a signal extraction circuit 314. The signal extraction circuit 314 extracts predetermined image signals Sp' from the final read-out image signals Sp as will be described in detail later, and sends the extracted final read-out image signals Sp' to a control circuit 315. Based on the image input information represented by the final read-out image signals Sp', the control circuit 315 adjusts gradation processing conditions (c) as one kind of the image processing conditions through histogram analysis of the like. Then, the final read out image signals Sp stored in the storage circuit 313 are read therefrom and fed to a signal processing circuit 316, in which they are subjected to signal processing (image processing) based on the image processing conditions (c) adjusted by the control circuit 315 so as to obtain a visible radiation image suitable for viewing, particularly for diagnostic purposes, and are output as image signals (final read-out image signals) So.

The final read-out image signals So generated by the signal processing circuit 316 are fed to a light modulator 401 at the image reproducing section 40. At the image reproducing section 40, a laser beam 403 emanated by a reproducing laser beam source 402 is modulated by the light modulator 401 on the basis of the final read-out image signals So received from the signal processing circuit 316, and is made to impinge upon a photosensitive material 405 such as a photographic film by a scanning mirror 404 for scanning the photosensitive material 405 by the laser beam 403. At this time, the photosensitive material 405 is moved normal to the aforesaid scanning direction, i.e. in the direction as :indicated by the arrow 406. Accordingly, the radiation image represented by the final read-out image signals So is recorded on the photosensitive material 405. For reproducing the radiation image, it is possible to use any other appropriate method such as the aforesaid displaying on a CRT.

Signal extraction by the aforesaid signal extraction circuit 314 will hereinbelow be described in detail. The signal extraction circuit 314 receives an unexposed region designating signal St from an unexposed region recognizing circuit 317. To the unexposed region recognizing circuit 317, a subdivision image recording signal Sd is entered by, for example, manual operation. At the radiation image recording section 20, subdivision image recording may be carried out as shown in FIG. 2 on the stimulable phosphor sheet 103. By way of example, the subdivision image recording signal Sd represents the number of subdivisions in subdivision image recording, and the exposed subdivisions at which image recording is actually carried out among all subdivisions. For example, in the case where subdivision identification numbers "1", "2", "3" and "4" are respectively assigned to the four subdivisions in the example shown in FIG. 2, the subdivision image recording signal Sd that represents "four" as the number of the subdivisions, and the subdivisions "1", "2" and "3" as the exposed subdivisions is entered to the unexposed region recognizing circuit 317 at the time subdivision image recording is carried out as in the example shown in FIG. 2.

Upon receiving the subdivision image recording signal Sd, the unexposed region recognizing circuit 317 generates the unexposed region designating signal St that represents the unexposed subdivision, i.e. the subdivision at which no image recording is carried out, on the stimulable phosphor sheet 103 (the subdivision "4" in the example shown in FIG. 2) on the basis of the subdivision image recording signal Sd. Specifically, subdivision image recording is carried out in a predetermined format. For example, in the case of four-on one subdivision image recording, image recording is carried out respectively at the four equal subdivisions in the format as shown in FIG. 2. The unexposed region recognizing circuit 317 stores the regions of the subdivisions in the respective formats, determines the region of the unexposed subdivision based on the number of the subdivisions and the exposed subdivisions represented by the subdivision image recording signal Sd, and generates the unexposed region designating signal St that represents the region of the unexposed subdivision. Specifically, in the example shown in FIG. 2, the unexposed region recognizing circuit 317 recognizes, based on the subdivision image recording signal Sd representing "four" as the number of subdivisions and exposed subdivisions "1", "2" and "3", that the subdivision "4" is the unexposed subdivision. Then, the unexposed region recognizing circuit 317 generates the unexposed region designating signal St which represents the region of the subdivision "4", i.e. a quarter region at the right lower part on the stimulable phosphor sheet 103.

Upon receiving the unexposed region designating signal St, the signal extraction circuit 314 removes the image signals at the region represented by the unexposed region designating signal St from the final read-out image signals Sp detected from the overall area of the stimulable phosphor sheet 103, and sends only the remaining final read-out image signals Sp' to the control circuit 315. Accordingly, the control circuit 315 adjusts the gradation processing conditions (c) based only on the final read-out image signals Sp' at the regions actually exposed to radiation for image recording, i.e. the subdivisions "1", "2" and "3" in this example. In this manner, it becomes possible to adjust the gradation processing conditions (c) to values suitable for the radiation images actually stored on the stimulable phosphor sheet 103.

In the case where the radiation image recording section 20 and the final read-out section 30 are connected with each other by the sheet conveyance means 110 or the like and respective stimulable phosphor sheets 103, 103, . . . are conveyed to the final read-out section 30 in the sequency of the image recording, the subdivision image recording signals Sd may be entered to the unexposed region recognizing circuit 317 merely in the sequence of the image recording. Specifically, by way of example, the unexposed region recognizing circuit 317 may be provided with a storage means for sequentially storing the unexposed region designating signals St for the respective stimulable phosphor sheets 103, 103, . . . , and may be constituted so that reading of the unexposed region designating signals St from the storage means and input thereof to the signal extraction circuit 314 are carried out in the sequence of the signal storing in synchronization with the final read-out. In this case, it is possible to use the respective unexposed region designating signals St for the aforesaid signal extraction in exact conformity with the respective stimulable phosphor sheets 103, 103, . . . .

On the other hand, in the case where the radiation image recording section 20 and the final read-out section 30 are disposed independently of each other and the stimulable phosphor sheets 103, 103, . . . are not necessarily sent to the final read-out step in the sequence of the image recording, identification codes such as bar codes inherent to the respective stimulable phosphor sheets 103, 103, . . . should be entered to the unexposed region recognizing circuit 317 together with the subdivision image recording signals Sd, and the unexposed region designating signals St generated by the unexposed region recognizing circuit 317 should be stored in the storage means in conformity with the identification codes. In this case, the identification code is read from the stimulable phosphor sheet 103 at the time of the final read-out, and the unexposed region designating signal St corresponding to the identification code is read from the storage means and entered to the signal extraction circuit 314.

As for a stimulable phosphor sheet 103 on which a single radiation image is recorded over the overall recording region, the aforesaid signal extraction should not be carried out by the signal extraction circuit 314. For this purpose, by way of example, the subdivision image recording signal Sd which represents "one" as the number of subdivisions and the exposed subdivision "1" should be entered to the unexposed region recognizing circuit 317, or no subdivision image recording signal Sd should be entered thereto for such a stimulable phosphor sheet 103. Also, at this time, the signal extraction circuit 314 should be deactivated so that all of the final read-out image signals Sp are allowed to pass therethrough.

The terminal device for entering the subdivision image recording signal Sd to the unexposed region recognizing circuit 317 should preferably be provided in the vicinity of the radiation image recording section 20 so that the subdivision image recording signal Sd may be entered from the terminal device simultaneously with the radiation image recording.

Figures 3, 4:
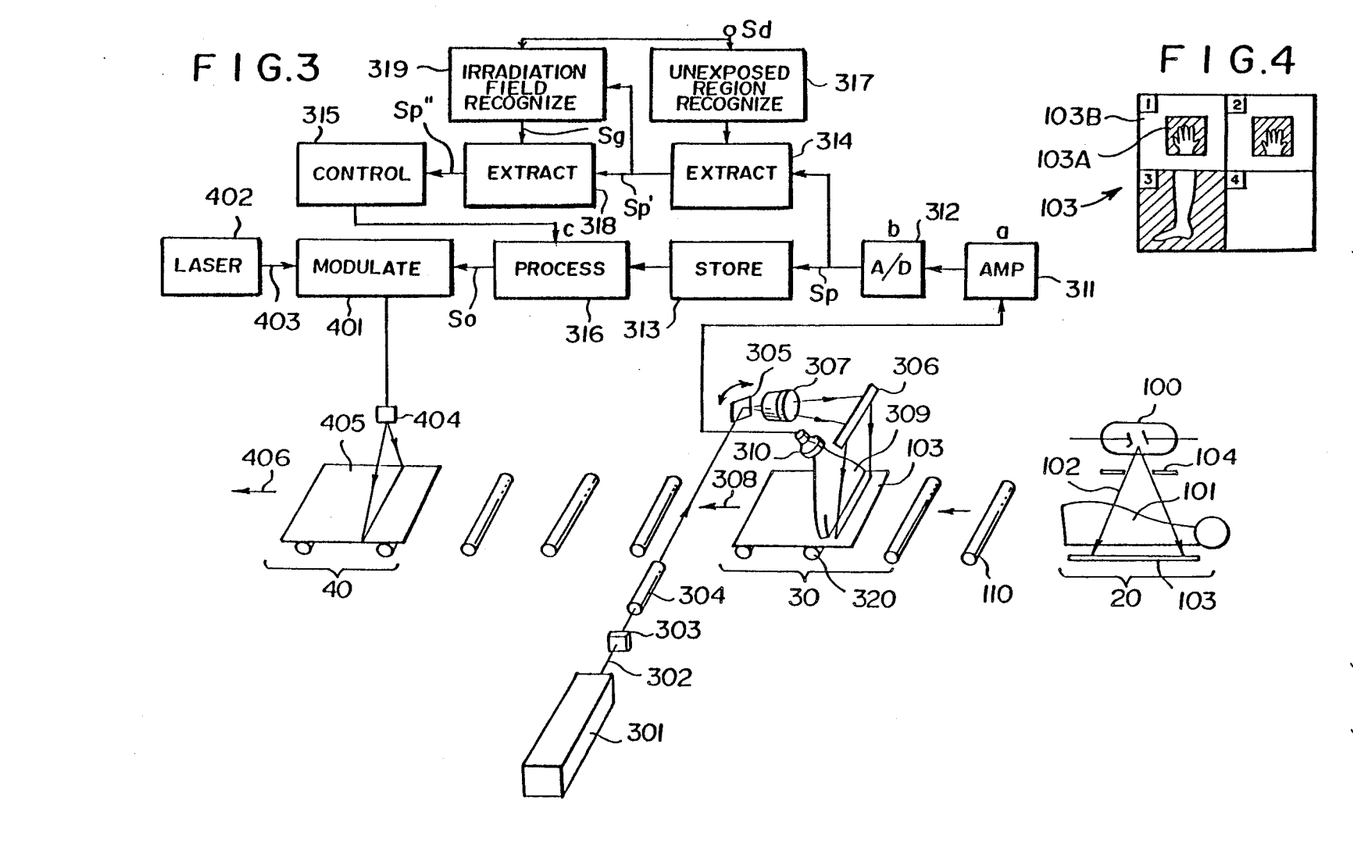
FIG. 3 is a schematic view showing the radiation image recording and reproducing system wherein radiation image read-out is carried out by another embodiment of the radiation image read-out apparatus in accordance with the present invention.
FIG. 4 is an explanatory view showing the condition of radiation image recording on a stimulable phosphor sheet.

Another embodiment of the radiation image read-out apparatus in accordance with the present invention will hereinbelow be described with reference to FIG. 3. In FIG. 3, similar elements are numbered with the same reference numerals with respect to FIG. 1. In this embodiment, the final read-out image signals Sp' obtained by the signal extraction circuit 314 are sent to the control circuit 315 via a second signal extraction circuit 318. Also, at the radiation image recording section 20, an irradiation field stop 104 for limiting the irradiation field of the radiation 102 is disposed between the radiation source 100 and the object 101.

In the case where subdivision image recording is carried out by limiting the irradiation field by the irradiation field stop 104, the condition of image recording on the stimulable phosphor sheet 103 becomes as shown in, for example, FIG. 4. In this example, an irradiation field 103A is limited to an area smaller than the possible recording region at the subdivisions "1" and "2". At a region 103B outside of the irradiation field 103A, exposure to the radiation 102 is prevented by the irradiation field stop 104. Therefore, the region 103B is substantially identical with the unexposed subdivision "4". In the case where the gradation processing conditions (c) are adjusted based on the final read-out image signals Sp' including the read-out image signals at the region 103B, the same problem as when the gradation processing conditions (c) are adjusted based on the final read-out image signals Sp including the read-out image signals at the unexposed subdivision "4" arises.

Accordingly, this embodiment is provided with an irradiation field recognizing circuit 319 to which the final read-out image signals Sp' and the subdivision image recording signal Sd are entered. The irradiation field recognizing circuit 319 detects the exposed subdivisions based on the subdivision image recording signal Sd, and recognizes the irradiation fields in the respective exposed subdivisions by use of the final read-out image signals Sp'. As the irradiation field recognizing circuit 319, it is possible to employ an apparatus for carrying out the method as disclosed in Japanese Unexamined Patent Publication No. 61(1986)-39039. The irradiation field recognizing circuit 319 sends signals Sg representing the regions recognized as the irradiation fields in the respective subdivisions to the second signal extraction circuit 318. The second signal extraction circuit 318 extracts the image signals at the regions represented by the signals Sg from the final read-out image signals Sp', and sends the final read out image signals Sp'' thus extracted to the control circuit 315. Therefore, the gradation processing conditions (c) are adjusted to appropriate values on the basis of only the final read-out image signals Sp'' at the portions of the stimulable phosphor sheet 103 which have been actually exposed to the radiation and carry the radiation images stored thereon.

Figure 5:
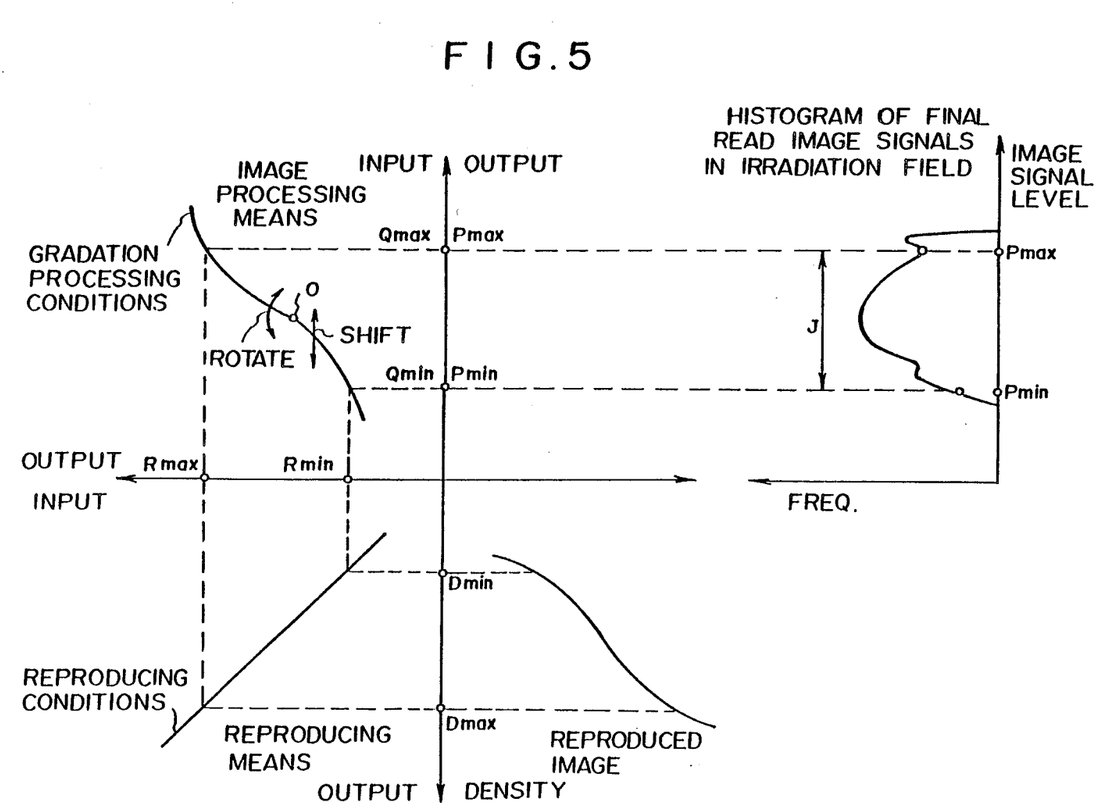
FIG. 5 is an explanatory graph showing an example of adjustment of gradation processing conditions in accordance with the present invention.

An example of the method of adjusting the gradation processing conditions in the control circuit 315 will hereinbelow be described in further detail with reference to FIG. 5.

In this method, a histogram (a histogram of the image signal levels) of the final read-out image signals (Sp' in the case of FIG. 1, or Sp'' in the case of FIG. 3) fed to the control circuit 315 is created. A desired image signal range J is determined on the basis of the histogram by an appropriate method, for example, with reference to the image recording portion of the object and/or the image recording method. Also, the maximum image signal level Pmax and the minimum image signal level Pmin in the desired image signal range J are calculated.

On the other hand, in the radiation image recording and reproducing system, the final read-out image signals are generally obtained from the light emitted by the stimulable phosphor sheet in proportion to the stored radiation energy by use of the photoelectric read-out means as mentioned above, and are subjected to gradation processing and other signal processing in an image processing means. The processed image signals are used to reproduce a visible image on a photographic film or the like by use of the image reproduction means. The reproduced visible image should have a correct density range suitable for viewing, particularly for diagnostic purposes. In general, the correct density range (Dmax to Dmin) is determined in advance. Also, image reproducing conditions in the image reproduction means (i.e. the conditions determining the relationship between the input to the image reproduction means and the output therefrom) are determined in advance. Therefore, the range of signal levels (Rmax to Rmin) which should be sent to the image reproduction means as suitable for obtaining the correct density range (Dmax to Dmin) is determined by the image reproducing conditions.

Accordingly, the gradation processing conditions in the gradation processing are adjusted so that the maximum image signal level Pmax and the minimum image signal level Pmin calculated in the manner as mentioned above correspond to the maximum signal level Rmax and the minimum signal level Rmin determined in the manner as mentioned above.

The gradation processing is carried out for converting the level of each image signal fed to an image processing means (a gradation processing means) by use of predetermined conditions. The predetermined conditions are referred to as the gradation processing conditions, and the gradation processing conditions are usually expressed by a non-linear gradation curve.

The purpose of the gradation processing is to obtain a visible reproduced image suitable for viewing, particularly for diagnostic purposes, in accordance with the image recording conditions, for example, the image recording portion of the object such as the head or the chest, and/or the image recording method such as plain image recording or contrasted image recording. Therefore, in general, basic patterns of non-linear gradation processing conditions most suitable for the respective image recording conditions should preferably be determined in advance, one of the basic patterns of the gradation processing conditions should be selected in accordance with the image recording conditions of an image in the course of gradation processing of the image, and the gradation processing should be carried out by use of the selected basic pattern.

Also in this embodiment, an appropriate basic pattern is selected from those of the gradation processing conditions predetermined in accordance with the image recording conditions of images. The gradation processing conditions which are to be used are adjusted by correcting the selected basic pattern on the basis of the image signals inside of the irradiation field, i.e. by, as shown in FIG. 5, vertically shifting the selected basic pattern or rotating it around a predetermined center point 0 so that Pmax corresponds to Rmax or Pmin corresponds to Rmin.

Besides the non linear gradation processing conditions determined by the image recording conditions as mentioned above, linear gradation processing conditions may be used in some cases. In such a case, the gradation processing conditions which are to be used are adjusted by rotating or shifting a single predetermined straight line in the manner as mentioned above so that Pmax corresponds to Rmax or Pmin corresponds to Rmin. The adjustment of the gradation processing conditions by this method is carried out on the basis of only the image signals inside of the image-recorded region, instead of on the basis of the image recording portion of the object and/or the image recording method.

With the method wherein the gradation processing conditions are adjusted on the basis of the final read-out image signals, for example, the histogram of the final read-out image signals, the problems as described below arise in the case where the image signals (noise) at the unrecorded regions such as the unexposed region and the region outside of the irradiation field are included in the histogram of the final read-out image signals.

Specifically, the image signals detected from the unrecorded regions are caused by the scattered radiation or the like. Though most of the image signals detected from the unrecorded regions are of very low level, some of said image signals may be of levels higher than the image signal levels inside of the image-recorded regions. Therefore, it is not always possible to discriminate between the image signal levels at the image-recorded regions and those at the unrecorded regions from the histogram including both of them. Therefore, in the case where Pmax and Pmin are calculated from the histogram as mentioned above and the image processing conditions are adjusted on the basis of Pmax and Pmin, the minimum image signal level inside of the image-recorded region at which the image recording has been actually carried out is not detected as Pmin, and the minimum value of the image signal levels caused by the scattered radiation inside of the unrecorded regions is detected as Pmin. In general, the minimum image signal level inside of the unrecorded regions is lower than that inside of the image-recorded regions. Accordingly, when the minimum image signal level inside of the unrecorded regions is detected as Pmin, signals caused by the scattered radiation not related to diagnosis are taken within a low density range in the course of reproduction of a visible image, and the density of the image of the portion related to diagnosis becomes too high. As a result, the image contrast decreases and it becomes difficult to make an accurate diagnosis.

However, with the aforesaid embodiment wherein Pmax and Pmin are calculated based on the the histogram of the final read-out image signals obtained by removing the image signals inside of the unrecorded regions, the aforesaid problems can be eliminated.

Specifically, in the case where gradation processing of the image signals is carried out by use of the gradation processing conditions adjusted to appropriate values in accordance with the image signal histogram of each radiation image stored on the stimulable phosphor sheet, it becomes possible to process so that the necessary object image information is always expressed within the correct density range for viewing, particularly for diagnostic purposes, in every reproduced visible image regardless of any fluctuation in the level of the radiation energy stored on the stimulable phosphor sheet, which is caused by changes in the object, the image recording portion thereof, radiation dose, or the like. Particularly, in accordance with the present invention wherein the gradation processing conditions are adjusted based on the final read-out image signals free from the image signals (noise) at the unrecorded regions, the effects of expressing the necessary object image information within the correct density range are enhanced markedly.

The method of adjusting the gradation processing conditions in the manner as mentioned above is advantageous particularly in the case where the image signals detected by use of the read-out conditions adjusted without considering a fluctuation in the radiation energy level range recorded in each image recording as mentioned above are to be processed.

I claim:

1. A radiation image read-out method in which final read-out is carried out for obtaining image signals for use in reproduction of a visible image from a recording medium carrying a radiation image of an object recorded thereon, image processing conditions for use in processing of the final read-out image signals obtained by the final read-out are adjusted, and image processing of the final read-out image signals is carried out by use of the image processing conditions, wherein the improvement comprises the steps of, in the case where subdivision image recording is carried out by exposing each of a plurality of subdivisions on said recording medium to radiation in the course of the radiation image recording:

(i) removing image signals at a subdivision, which has not been exposed to the radiation, from said final read-out image signals obtained by said final read-out on the basis of information on said subdivision image recording, and (ii) adjusting said image processing conditions on the basis of the remainder of said final read-out image signals, wherein, in the case irradiation fields of the radiation at a plurality of said subdivisions are limited in the course of subdivision image recording said irradiation fields are detected on the basis of said remainder of said final read-out image signals, the image signals inside of said irradiation fields are extracted from said remainder of said final read-out image signals, and said image processing conditions are adjusted on the basis of said extracted image signals inside of said irradiation fields; and wherein said image processing conditions are gradation processing conditions, and said gradation processing conditions are adjusted by:

(a) creating a histogram of said extracted image signals inside of said irradiation fields, (b) calculating the maximum image signal level Pmax and the minimum image signal level Pmin of a desired image signal range from said histogram, and (c) adjusting said gradation processing conditions so that the maximum image signal level Pmax and the minimum image signal level Pmin correspond respectively to the maximum signal level Rmax and the minimum signal level Rmin of a desired input signal range in an image reproduction means which are determined by the maximum density Dmax and the minimum density Dmin of a correct density range in a reproduced visible image.

2. A method as defined in claim 1 wherein said recording medium is a stimulable phosphor sheet, and said image signals are detected from said stimulable phosphor sheet carrying the radiation image stored thereon by exposing said stimulable phosphor sheet to stimulating rays which cause it to emit light in proportion to the stored radiation energy.

3. A method as defined in claim 2 wherein said stimulating rays are a laser beam.

4. A radiation image read-out method in which final read-out is carried out for obtaining image signals for use in reproduction of a visible image from a recording medium carrying a radiation image of an object recorded thereon, image processing conditions for use in processing of the final read-out image signals obtained by the final read-out are adjusted, and image processing of the final read-out image signals is carried out by use of the image processing conditions, wherein the improvement comprises the steps of, in the case where subdivision image recording is carried out by exposing each of a plurality of subdivisions on said recording medium to radiation in the course of the radiation image recording:

(i) removing image signals at a subdivision, which has not been exposed to the radiation, from said final read-out image signals obtained by said final read-out on the basis of information on said subdivision image recording, and (ii) adjusting said image processing conditions on the basis of the remainder of said final read-out image signals, wherein said image processing conditions are gradation processing conditions, and said gradation processing conditions are adjusted by:

(a) creating a histogram of said remainder of said final read-out image signals, (b) calculating the maximum image signal level Pmax and the minimum image signal level Pmin of a desired image signal range from said histogram, and (c) adjusting said gradation processing conditions so that the maximum image signal level Pmax and the minimum image signal level Pmin correspond respectively to the maximum signal level Rmax and the minimum signal level Rmin of a desired input signal range in an image reproduction means which are determined by the maximum density Dmax and the minimum density Dmin of a correct density range in a reproduced visible image.

5. A radiation image read-out apparatus comprising:

(i) a final read-out system for detecting final read-out image signal for use in reproduction of a visible image from a recording medium carrying a radiation image on an object recorded thereon, (ii) an unexposed region recognizing means for receiving information on subdivision image recording carried out in the course of the radiation image recording on said recording medium, detecting the region of an unexposed subdivision, at which no radiation image recording has been carried out, on the basis of said information on subdivision image recording, and generating a region designating signal which represents said region, (iii) a signal extraction means for receiving the final read-out image signals generated by said final read-out system and said region designating signal, removing the image signals at said region represented by said region designating signal from said final-read-out image signals, and feeding out only the remainder of said final read-out image signals.

(iv) a control means for adjustment of image processing conditions, which are to be used in image processing of said final read-out image signals generated by said final read-out system, on the basis of said final read-out image signals at an exposed region fed out from said signal extraction means, (v) a signal processing means for carrying out image processing of said final read-out image signals generated by said final read-out system by use of said image processing conditions adjusted by said control means, (vi) an irradiation field recognizing means for receiving said information on subdivision image recording and said remainder of said final read-out image signals, detecting the regions of exposed subdivisions, at which the radiation image recording has been carried out, on the basis of said information or subdivision image recording detecting irradiation fields on the radiation at a plurality of said subdivisions on the basis of said remainder of said final read-out image signals, and generating signals which represent said irradiation fields, and (vii) a second signal extraction means for receiving said signals representing said irradiation fields and said remainder of said final read-out image signals, extracting the image signals inside of said irradiation fields from said remainder of said final read-out image signals, and feeding said extracted image signals inside of said irradiation fields to said control means, whereby said control means adjusts said image processing conditions on the basis of said extracted image signals inside of said radiation field, and wherein said image processing conditions are gradation processing conditions, and said gradation processing conditions by:

(a) creating a histogram of said extracted image signals inside of said irradiation fields, (b) calculating the maximum image signal level Pmax and the minimum image signal level Pmin of a desired image signal range from said histogram, and (c) adjusting said gradation processing conditions so that the maximum image signal level Pmax and the minimum image signal level Pmin correspond respectively to the maximum signal level Rmax and the minimum signal level Rmin of a desired input signal range in an image reproduction means which are determined by the maximum density Dmax and the minimum density Dmin of a correct density range in a reproduced visible image.

6. An apparatus as defined in claim 5 further comprising a terminal device provided in the vicinity of a radiation image recording section for entering said information on subdivision image recording to said unexposed region recognizing means.

7. An apparatus as defined in claim 5 wherein said recording medium is a stimulable phosphor sheet, and said image signals are detected from said stimulable phosphor sheet carrying the radiation image stored thereon by exposing said stimulable phosphor sheet to stimulating rays which cause it to emit light in proportion to the stored radiation energy.

8. An apparatus as defined in claim 7 wherein said stimulating rays are a laser beam.

9. A radiation image read-out apparatus comprising:

(i) a final read-out system for detecting final read-out image signals for use in reproduction of a visible image from a recording medium carrying a radiation image of an object recorded thereon, (ii) an unexposed region recognizing means for receiving information on subdivision image recording carried out in the course of the radiation image recording on said recording medium, detecting the region of an unexposed subdivision, at which no radiation image recording has been carried out, on the basis of said information on subdivision image recording, and generating a region designating signal which represents said region (iii) a signal extraction means for receiving the final read-out image signals generated by said final read-out system and said region designating signal, removing the image signals at said region represented by said region designating signal from said final read-out image signals, and feeding out only the remainder of said final read-out image signals, (iv) a control means for adjustment of image processing conditions, which are to be used in image processing of said final read-out image signals generated by said final read-out system, on the basis of said final read-out image signals at an exposed region fed out from said signal extraction means, and (v) a signal processing means for carrying out image processing of said final read-out image signals generated by said final read-out system by use of said image processing conditions adjusted by said control means, wherein said control means adjusts gradation processing conditions as said image processing conditions as said image processing conditions by:

(a) creating a histogram of said remainder of said final read-out image signals, (b) calculating the maximum image signal level Pmax and the minimum image signal level Pmin of a desired image signal range from said histogram, and (c) adjusting said gradation processing conditions so that the maximum image signal level Pmax and the minimum image signal level Pmin correspond respectively to the maximum signal level Rmax and the minimum signal level Rmin of a desired input signal range in an image reproduction means which are determined by the maximum density Dmax and the minimum density Dmin of a correct density range in a reproduced visible image.

* * * * *